United States Patent
Sweetland

(10) Patent No.: US 11,850,793 B2
(45) Date of Patent: Dec. 26, 2023

(54) LASER ARRAY POSITION DETECTION

(71) Applicant: VulcanForms Inc., Burlington, MA (US)

(72) Inventor: Matthew Sweetland, Bedford, MA (US)

(73) Assignee: VulcanForms Inc., Burlington, MA (US)

(*) Notice: Subject to any disclaimer, the term of this patent is extended or adjusted under 35 U.S.C. 154(b) by 0 days.

(21) Appl. No.: 17/009,892

(22) Filed: Sep. 2, 2020

(65) Prior Publication Data

US 2021/0060857 A1 Mar. 4, 2021

Related U.S. Application Data

(60) Provisional application No. 62/895,677, filed on Sep. 4, 2019.

(51) Int. Cl.
*B29C 64/393* (2017.01)
*B23K 26/06* (2014.01)
(Continued)

(52) U.S. Cl.
CPC ........ *B29C 64/153* (2017.08); *B23K 26/0643* (2013.01); *B23K 26/0648* (2013.01); *B23K 26/082* (2015.10); *B29C 64/236* (2017.08); *B29C 64/245* (2017.08); *B29C 64/268* (2017.08); *B29C 64/277* (2017.08); *B29C 64/282* (2017.08); *B29C 64/286* (2017.08); *B29C 64/386* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/386; B29C 64/393; B29C 64/277; B29C 64/129; B29C 64/264; B29C 64/268; B29C 64/273; B29C 64/282; B29C 64/286; B29C 64/291; B29C 71/04; B33Y 50/02
See application file for complete search history.

(56) References Cited

U.S. PATENT DOCUMENTS 6,646,728 B1 * 11/2003 Tang .................... B23K 26/705
356/123
9,956,612 B1 5/2018 Redding et al.
(Continued)

FOREIGN PATENT DOCUMENTS

WO WO 2017/108762 A1 6/2017

OTHER PUBLICATIONS

International Search Report and Written Opinion for International Application No. PCT/US2020/048983, dated Nov. 17, 2020.

*Primary Examiner* — Philip C Tucker
*Assistant Examiner* — Jimmy R Smith, Jr.
(74) *Attorney, Agent, or Firm* — Wolf, Greenfield & Sacks, P.C.

(57) ABSTRACT

Aspects described herein relate to additive manufacturing systems and related methods. In some embodiments, an additive manufacturing system includes a laser array position detector to determine a position and/or orientation of laser energy pixels in a laser array. The laser array position detector may include an aperture and an optical sensor positioned within the aperture to detect laser energy from a laser energy pixel when the laser array is scanned across the aperture.

24 Claims, 10 Drawing Sheets

(51) Int. Cl.
    *B29C 64/268*   (2017.01)
    *B29C 64/286*   (2017.01)
    *B29C 64/282*   (2017.01)
    *B29C 64/277*   (2017.01)
    *B29C 64/386*   (2017.01)
    *B33Y 30/00*    (2015.01)
    *B29C 64/153*   (2017.01)
    *B23K 26/082*   (2014.01)
    *B29C 64/245*   (2017.01)
    *B29C 64/236*   (2017.01)
    *B33Y 50/02*        (2015.01)
    *B33Y 10/00*        (2015.01)

(56)  References Cited

U.S. PATENT DOCUMENTS

| | | |
|---|---|---|
| 10,022,795 B1 | 7/2018 | Redding et al. |
| 2003/0052105 A1* | 3/2003 | Nagano ................ B29C 64/277 |
| | | 219/121.83 |
| 2016/0082668 A1* | 3/2016 | Perret .................... B29C 64/153 |
| | | 425/135 |
| 2016/0158889 A1 | 6/2016 | Carter et al. |
| 2016/0368050 A1 | 12/2016 | Morris et al. |
| 2017/0021455 A1 | 1/2017 | Dallarosa et al. |
| 2017/0056975 A1 | 3/2017 | Carter et al. |
| 2018/0093416 A1 | 4/2018 | Prexler et al. |
| 2018/0200792 A1 | 7/2018 | Redding et al. |
| 2018/0207722 A1 | 7/2018 | Feldmann et al. |
| 2018/0215102 A1 | 8/2018 | Amaya et al. |
| 2018/0236549 A1 | 8/2018 | Spears et al. |
| 2018/0281067 A1* | 10/2018 | Small ..................... B22F 10/20 |
| 2018/0361728 A1* | 12/2018 | Philippi ................ B33Y 10/00 |
| 2019/0077086 A1 | 3/2019 | Stengel et al. |
| 2019/0143406 A1 | 5/2019 | Carter et al. |
| 2019/0299286 A1 | 10/2019 | Feldmann et al. |
| 2020/0039000 A1 | 2/2020 | Sweetland |
| 2020/0108465 A1 | 4/2020 | Sweetland |

* cited by examiner

LASER ARRAY POSITION DETECTION

CROSS-REFERENCE TO RELATED APPLICATIONS

This application claims the benefit of priority under 35 U.S.C. § 119(e) of U.S. Provisional Application Ser. No. 62/895,677, filed Sep. 4, 2019, the disclosure of which is incorporated herein by reference in its entirety.

FIELD

Disclosed embodiments are related to systems and methods for detecting a position and/or orientation of an array of laser energy pixels.

BACKGROUND

Powder bed fusion processes are an example of additive manufacturing processes in which a three-dimensional shape is formed by selectively joining material in a layer-by-layer process. In metal powder bed fusion processes, one or multiple laser beams are scanned over a thin layer of metal powder. If the various laser parameters, such as laser power, laser spot size, and/or laser scanning speed are in a regime in which the delivered energy is sufficient to melt the particles of metal powder, one or more melt pools may be established on a build surface. The laser beams are scanned along predefined trajectories such that solidified melt pool tracks create shapes corresponding to a two-dimensional slice of a three-dimensional printed part. After completion of a layer, the powder surface is indexed by a defined distance, the next layer of powder is spread onto the build surface, and the laser scanning process is repeated. In many applications, the layer thickness and laser power density may be set to provide partial re-melting of an underlying layer and fusion of consecutive layers. The layer indexing and scanning is repeated multiple times until a desired three-dimensional shape is fabricated.

Both single laser and multi-laser systems are used. Some systems use a pair of galvanometer mounted mirrors to scan each laser beam over the desired pattern on the build surface. Some systems use motion stages to scan the laser over the build surface. Some systems use a combination of motion stages and galvanometers to scan the laser over the build surface. Systems that use galvanometers as part of the scanning method often use f-theta or telecentric lens to help keep the incident angle of the laser beam onto the build surface as close to perpendicular as possible for a given build surface size. The spacing between the final optical component of any laser path (e.g., final optics, galvanometer, mirror, telecentric lens or f-theta lens) may be on the order of a few millimeters up to a hundred or more centimeters.

SUMMARY

In one embodiment, an additive manufacturing system comprises a build surface, a plurality of laser energy sources, an optics assembly movable relative to a build surface and configured to direct laser energy from the plurality of laser energy sources towards the build surface and to form an array of laser energy pixels on the build surface, and a laser array position detector. The laser array position detector comprises an aperture sized and shaped to permit laser energy from one laser energy pixel of the array of laser energy pixels to pass through the aperture, and a sensor configured to detect the laser energy from the laser energy pixel after passing through the aperture. The system further comprises a controller operatively coupled to the optics assembly and the sensor. The controller is configured to move the optics assembly relative to the aperture to scan the laser energy pixel across the aperture, and to determine a position of the laser energy pixel relative to a reference position of the optics assembly.

In another embodiment, a method for determining a positon of a laser pixel array comprises activating a first laser energy pixel of an array of laser energy pixels, scanning the array of laser energy pixels across an aperture of a laser array position detector, detecting laser energy from the first laser energy pixel with a sensor of the laser array position detector, and determining a positon of the first laser energy pixel relative to a reference position.

In a further embodiment, a method for determining a position of a vision system relative to a laser array comprises activating a first laser energy pixel of an array of laser energy pixels, scanning the first laser energy pixel along a build surface to form a pattern, and recording a first position of the array of laser energy pixels when forming the pattern. The method further comprises detecting the pattern with a vision system recording a second position of the vision system when the pattern is detected, and determining an offset distance based on the first and second positions.

In yet another embodiment, a method for determining a position of a vision system relative to a laser array comprises activating a laser energy pixel of an array of laser energy pixels. The array of laser energy pixels is projected onto the build surface from an optics assembly of an additive manufacturing system that is movable relative to the build surface. The method further comprises scanning the optics assembly across an aperture of a laser array position detector, detecting laser energy from the laser energy pixel with an optical sensor of the laser array position detector, and determining a first positon of the optics assembly when laser energy is detected by the optical sensor. The method further comprises scanning the optics assembly across a reference target detecting the reference target with a vision system sensor mounted on the optics assembly, determining a second position of the optics assembly when the reference target is detected by the vision system sensor, and determining an offset distance between the vision system sensor and the laser energy pixel, at least in part, based on the first and second positions of the optics assembly and a distance between the reference target and the optical sensor.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
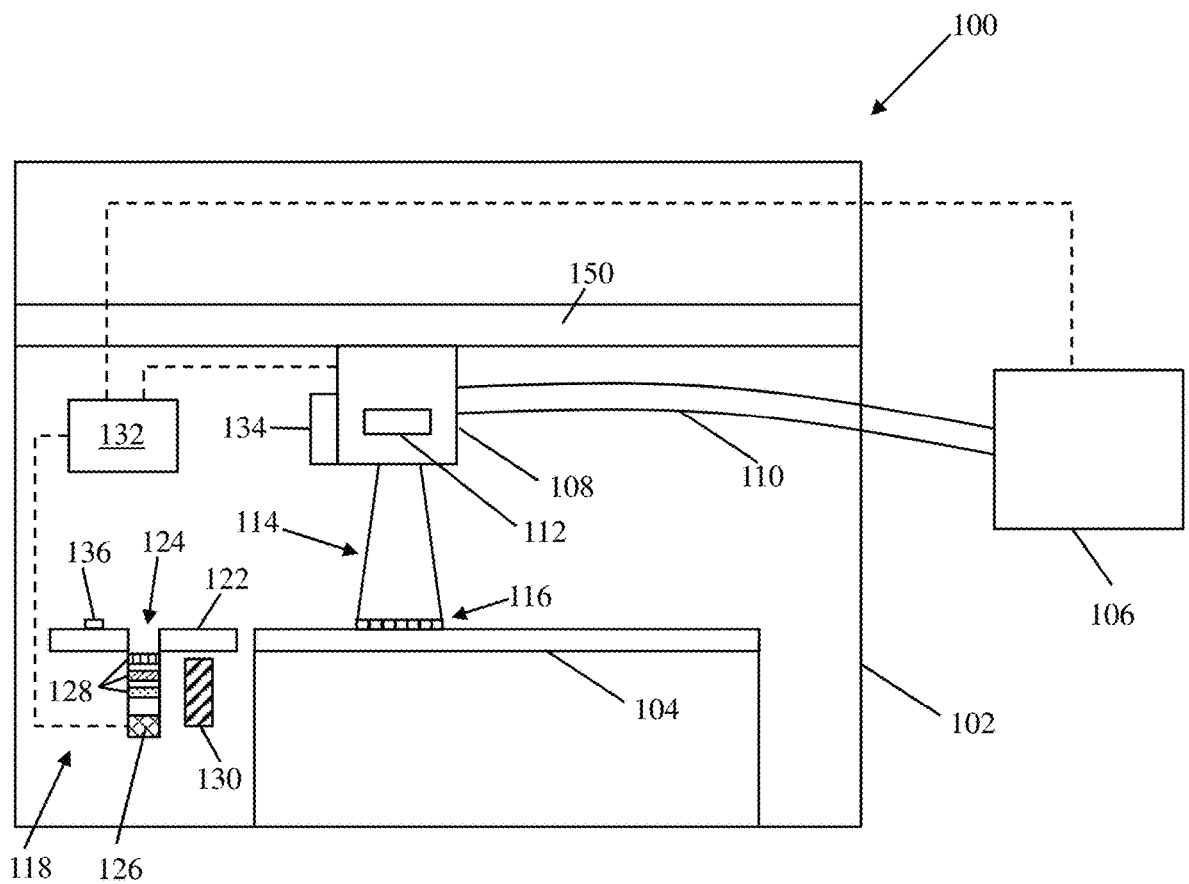
FIG. 1 is a schematic representation of an additive manufacturing system, according to some embodiments.

The inventors have recognized and appreciated that the manufacturing speed and throughput of additive manufacturing systems such as powder bed fusion systems is limited by the rate at which the powdered material can be fused. The rate of material fusion is dependent on multiple factors, including the total power delivered to the powdered material in the build volume of the system, as well as the energy per unit mass required to fuse the powdered material. In some instances, such as in systems utilizing one or more laser energy sources to deliver power to the build volume, the rate of fusion may be increased by increasing the power level of the one or more laser energy sources. However, the extent to which the power level of the individual laser energy sources can be increased is limited by the process physics of laser fusion. For example, when the power level and scan speed are increased above critical limits, Rayleigh instability of the melt pool can occur, leading to defects in the manufactured parts. Accordingly, the inventors have recognized numerous benefits associated with additive manufacturing systems including a plurality of laser energy sources that are each operated at power levels below such critical levels. For example, by increasing the number of laser energy sources that can simultaneously fuse powder in a powder bed fusion process, the total power delivered to the build volume may be increased, and thus the rate of fusion can be increased. In view of the above, the inventors have appreciated numerous benefits associated with additive manufacturing systems in which a plurality of laser energy sources are configured to form an array of laser energy pixels (i.e., a laser array) that can be directed towards a build surface (i.e., a powder bed surface) to selectively fuse the powdered material on the build surface. For example, the plurality of laser energy sources may be coupled to an optics assembly via optical fibers associated with each laser energy source, and the optics assembly may be configured to receive the laser energy from each of the laser energy sources and direct the laser energy to form the array of laser energy pixels on the build surface. As described below, the optics assembly may include a plurality of optical components that define a fixed arrangement and spacing between the laser energy pixels of the laser array. During an additive manufacturing process, the optics assembly may be scanned across the build surface, and the individual laser energy pixels in the array may be selectively actuated to form a desired pattern of laser energy on the build surface (e.g., corresponding to a geometry of a part being manufactured).

While an optics assembly may define a fixed arrangement and spacing between laser energy pixels in a laser array, the inventors have appreciated that variations in how the optics assembly is mounted to a gantry system (or other suitable structure in an additive manufacturing system) and/or variations in the internal optical components of the optical assembly (e.g., variations within manufacturing tolerances) may affect the position of the laser energy pixels on a powder bed surface. Thus, while the general position of the optics assembly may be known throughout an additive manufacturing process, the inventors have appreciated that it may be beneficial to more precisely determine the position and/or orientation of the laser array that is projected onto the powder bed surface during a manufacturing process. As described in more detail below, the systems and methods described herein may allow for the determination of the precise position and orientation of the laser array relative to a reference position, such as a master reference position of the additive manufacturing system or a reference position of the optics assembly. In this manner, the true position of each laser energy pixel in the laser array may be known throughout a manufacturing process, which may allow for high resolution and accurate manufacturing of parts.

According to some aspects, an additive manufacturing system may include a laser array position detector configured to detect the position of the laser energy pixels in a laser array. In some embodiments, the laser array position detector may be positioned adjacent a build surface (i.e., powder bed surface) within a build chamber of the additive manufacturing system. For example, the laser array position detector may comprise an aperture formed in a plate with a sensor positioned under the aperture. The aperture may be sized and shaped such that laser energy from only a single laser energy pixel of the laser array may pass through the aperture towards the sensor. Moreover, the sensor may be configured to be sensitive to the specific wavelengths of laser energy used in the additive manufacturing system. The laser array may be scanned across the aperture, for example, by scanning an optics assembly of the additive manufacturing system across the plate in which the aperture is formed. In this manner, the position of the laser array (e.g., a position of the optics assembly within the build volume) at which the sensor detects a signal from an active laser energy pixel in the laser array may be used to determine the position of active laser energy pixel relative to a reference position, such as a system master reference position or a reference position of the optics assembly. For example, the position of the active laser energy pixel may be determined relative to a predetermined origin position within the build volume (which may define the system master reference position) and/or relative to a current position of the optics assembly (e.g., as measured by an encoder of a gantry system) to determine an offset between the active pixel position and the position of the optics assembly.

Depending on the particular embodiment, a sensor and aperture of a laser array position detector may be arranged in any suitable manner. For example, in some embodiments, a sensor may be directly coupled to a plate in which the aperture is formed on a side opposite an optics assembly. In other embodiments, the sensor may be spaced from the aperture. In some such embodiments, one or more optical components, such as lenses, filters (e.g., polarizing filters), mirrors, and/or partial pass filters may be positioned between the aperture and the sensor. For example, such optical components may aid in directing laser energy transmitted through the aperture towards the sensor. In some embodiments, one or more optical components, such as partial pass filters, may be used to reduce an amount of laser energy that is directed towards the sensor. For example, a partial pass filter may limit the amount of laser energy transmitted to the sensor to a small percentage of the incident laser energy transmitted through the aperture from the optics assembly. Accordingly, a sensor having a higher sensitivity and/or lower power rating may be used in conjunction with high power laser energy sources. In such embodiments, excess energy that is not transmitted through the partial pass filter to the sensor may be directed towards one or more light capture units such as a black box, a thermal sink, and/or a cooled thermopile.

Moreover, it should be understood that the current disclosure is not limited to any particular type of sensor for detecting laser energy (or any other suitable form of electromagnetic radiation or other energy) passing through the aperture. For example, in some embodiments, the sensor may be an optical sensor (e.g., photo diodes, arrays of photo diodes, charge coupled devices (ccds), etc.) sensitive to a particular wavelength of laser energy corresponding to the laser energy sources used in an additive manufacturing system, such as wavelengths of approximately 1080 nm corresponding to fiber laser sources. Depending on the embodiment, the sensor may be configured to provide a digital output based on a minimum incident energy threshold, or the sensor may be an analog sensor that may be configured to output a control signal proportional to the incident energy sensed by the sensor. The sensor may be coupled to a controller of the additive manufacturing system, which may be configured to control movement of the optics assembly (e.g., along a gantry or other suitable system). In this manner, the output of the sensor, which may correspond to detection of laser energy from a laser energy pixel in a laser array, may be correlated to the position of the optics assembly to determine a relative position of the laser energy pixel and optics assembly. Moreover, in some instances, the controller may use the sensor output as a signal to control one or more aspects of a method for determining the position of the laser energy pixels in a laser array, as described in more detail below.

In some embodiments, a laser array position detector may include more than one aperture, as well as sensors associated with each aperture. For example, a first aperture and sensor may be configured to detect a position of a laser energy pixel along a first axis, and a second and sensor may be configured to detect the position of the laser energy pixel along a second axis. In some such embodiments, each aperture may have an elongated shape (e.g., a rectangular shape) within a plane of a plate in which the apertures are formed. Accordingly, it should be understood that the aperture(s) in a laser array positon detector may have any suitable shape, including, but not limited to, circles, ovals, squares, rectangles, other polygons, and/or irregular shapes.

Moreover, in some instances, one or more apertures may extend below a plate in which it is formed (i.e., towards a sensor), to define a channel extending between an upper opening of the aperture and the sensor. Such arrangements may be used to ensure that an optics assembly is oriented properly with respect to a build surface of an additive manufacturing system For example, the apertures may be arranged to ensure that laser energy from the optics assembly is directed towards the build surface along a direction substantially normal to the build surface. In other embodiments, an extended aperture may be oriented at an angle to ensure that laser energy is directed at the build surface along a non-orthogonal angle. For instance, such arrangements may be desirable to reduce reflection of laser energy from the build surface back towards the optics assembly. Accordingly, it should be understood that the current disclosure is not limited to any particular angle at which an optics assembly is configured to direct laser energy towards a build surface, and a laser array position detector may be configured to detect the positon of laser energy pixels incident on the detector at any desired angle.

In some embodiments, an optics assembly may define a laser array in which the relative position, spacing, and/or orientation of each laser energy pixel in the array is fixed. In such embodiments, the systems and methods described herein may use this known relationship to determine the position of each laser energy pixel in the laser array by detecting the positions of a small number of laser energy pixels. For example, in systems employing a linear array (i.e., a laser energy line), a laser array position detector may be used to determine the positon of the first and last laser energy pixels in the line, which may define the position and orientation (e.g., a rotation) of the line relative to a reference position and/or orientation. Similarly, in systems employing a two-dimensional array of laser energy pixels, the position of two or more laser energy pixels may be used to determine the position and orientation of the array relative to a reference position and/or orientation. Once the position of the laser array is determined by the laser array position detector, the position of each pixel in the array relative to a reference position may be determined based on the prior known geometry of the laser array, and the system may use these positions of each pixel during a build process to ensure that a part is correctly manufactured.

Alternatively or additionally, in some embodiments, at least a portion of the laser energy pixels comprising a laser array may be spaced apart from one another. In some such embodiments, the laser array position detectors described herein may be used to detect the spacing between the individual pixels. For example, each pixel may be may be scanned across an aperture of the detector, and the position of each pixel may be recorded as the sensor detects laser energy from each respective pixel. Moreover, in some instances, a size of the aperture may be similar to or smaller than a size of each laser energy pixel in a laser array. For example, in embodiments in which the aperture is smaller than a size of the laser energy pixels, the laser array position detector may be used to determine the size of the laser energy pixels. In particular, the optics assembly may be scanned over the aperture with a laser energy pixel activated, and the size of the laser energy pixel may be determined based on a first position of the optics assembly when the sensor of the laser array position detector begins detecting laser energy from the laser energy pixel and a second position of the optics assembly when the laser energy from the laser energy pixel is no longer detected.

According to some aspects, a method for detecting the position of one or more laser energy pixels in a laser array may include activating a first laser energy pixel in the laser array, and subsequently scanning the laser energy pixel across an aperture of a laser array position detector along a first direction. For example, the laser energy pixel may be scanned across the detector by moving an optics assembly from which the laser array is emitted via a gantry system or other suitable structure configured to move the optics assembly along one or more directions within an additive manufacturing system. When the sensor of the laser array position detector detects the laser energy from the activated laser energy pixel, the position of the laser energy pixel along the first direction may be recorded. If desired, the process described above may be repeated by scanning the laser energy pixel across the detector along a second direction to determine the position of the laser energy pixel along the second direction. In this manner, the first and second positions may define a positon of the laser energy pixel in a plane, which may correspond to a plane of a build surface (i.e., powder bed surface) of the additive manufacturing system. In some instances, the above described method may be repeated for one or more additional laser energy pixels in the laser array. For example, after the first laser energy pixel is located, that pixel may be deactivated and a second the above-described process may be repeated for a second laser energy pixel in the array. Depending on the particular embodiment, the process may be repeated for each laser energy pixel in the array or for a subset of the laser energy pixels in the array.

Depending on the particular embodiment, a laser energy pixel may be scanned across a laser array position detector in any suitable manner. For example, in some embodiments, the laser energy pixel may be scanned in a single pass at a fixed speed. In other embodiments, multiple scanning passes may be used. For example a plurality of scanning passes may comprise a set of high speed passes performed until an approximate position of the laser energy pixel is determined, at which point one or slower, higher accuracy scanning passes may be performed to more precisely determine the positon of the laser energy pixel.

In some instances, such as during an initial setup of a system, after a new optics assembly is installed in a system, and/or when an optics assembly is adjusted during maintenance of a system, a position of a first laser energy pixel in a laser array may be only approximately known. In such cases, the first laser energy pixel may need to be scanned multiple times across a laser array position detector along a first direction while incrementally moving the laser energy pixel along a second direction between successive scans. For example, a gantry (or similar structure) supporting an optics assembly of an additive manufacturing system may scan the optics assembly over a predetermined length (e.g. along about 10 mm) in the first direction, and between successive scans, the gantry may move the optics assembly a small incremental distance (e.g., about 50 microns) along the second direction. This process may continue until the position of the optics assembly is determined that corresponds to the position of the first laser energy pixel.

In some embodiments, an incident laser power of a laser energy pixel that is being detected can be adjusted by a control system. In particular, the incident laser power may be increased or decreased based on control inputs to each laser energy source (associated with a corresponding laser energy pixel). For example, in embodiments utilizing lower sensitivity sensors with the ability to absorb and sink large amounts of power, the laser power may be increased. In other embodiments using higher sensitivity sensors and/or sensors with the ability to only absorb and sink smaller amounts of energy, a lower laser power may be used. Depending on the particular embodiment, the each laser energy source may be operated in a continuous mode at high or low powers, or each laser energy source may be operated in a pulsed mode at high or low powers. In some instances, using a pulsed mode may allow for lower net power settings than are typically obtainable in continuous mode operation. For example, some fiber lasers are limited to operation at a minimum of 10% of the system power for continuous operation; by operating at the minimum 10% power level and pulsing the lasers at a 10% duty cycle, the effective laser power can be reduced to 1%. In this manner, even low power detectors can be used in conjunction with high power laser sources, such as high power fiber lasers. If a pulsed laser method is used, the scan speed of an optics array over the aperture of a laser array position detector may be reduced in order to prevent a loss in positional accuracy for the sensed pixel. In particular, if a pulsed array is scanned too fast over the sensor aperture, the sensor may detect an incorrect pixel offset position or may miss the pixel position altogether.

According to some aspects, a base plate in which aperture(s) of a laser array position detector are formed may be constructed and arranged to reduce or minimize damage from the laser energy pixels that are scanned over it. For example, suitable approaches to reduce or minimize such damage may include using materials with a high thermal conductivity such as copper, using a base plate that has integral heat sinking capabilities such as liquid cooling channels, and/or applying a surface coating or finish to the base plate that increases the reflectivity and decreases the energy absorption into the base plate. In this manner, surface damage to the base plate and the apertures formed therein may be reduced or prevented during scanning of a laser array while sufficient energy is maintained for the aperture sensor to detect the positions of the laser energy pixels. In some embodiments, a desired operational design point can be obtained by adjusting the incident laser beam power, scanning speed, sensor type, aperture plate material/configuration and/or optical surface conditions.

While some embodiments described above include an aperture formed in a base plate, it should be understood that the current disclosure is not limited to such arrangements, and that other arrangements for a laser array position detector not including a base plate may be suitable. For example, in some embodiments, a laser array position detector may include a laser energy sensor positioned within an aperture tube, and this assembly may be mounted within a free volume within an additive manufacturing system. The inventors have appreciated that such arrangements may aid in avoiding the above-described issues related to damage to the base plate when the laser array is scanned over the laser array position detector. Similar to the embodiments described above, the aperture tube may include an aperture formed level with the build surface of the additive manufacturing system, and the sensor may be positioned within the aperture to limit detection of laser energy a desired incident angle (such as normal to the build surface). However, by mounting the aperture tube and sensor in free space within the build volume, an amount of material exposed to the focal plane of the laser energy sources of the laser array may be minimized, which may aid in reducing damage during each position detection operation. For example, a mounting structure of the sensor and aperture tube assembly may be spaced from the focal plane of the lasers at a position at which the incident laser energy is more diffuse compared to the focal plane, and thus less likely to cause damage.

As noted above, an additive manufacturing system may include a controller configured to control one or more aspects of the operation of an additive manufacturing process, such as movement of an optics assembly over a build surface (e.g., via a gantry or other suitable system on which the optics assembly is mounted). An output of a sensor of a laser array position detector may be operatively coupled to the controller such that the output of the sensor may be correlated to a position of the optics assembly to determine a position of a laser pixel relative to the position of the optics assembly. For example, the position of the optics assembly may be determined by an encoder of a motor used to move the optics assembly along a gantry system, and the controller may be configured to record the position of the optics assembly upon receiving a signal from the sensor corresponding to detection of a laser energy pixel the laser array. In some embodiments, the sensor and controller may be configured to define a detection threshold, such that the controller receives an on/off digital signal from the sensor. Alternatively, the sensor may be configured to provide an analog signal that may evaluated by the controller. For example, the analog signal may be evaluated based on a fixed threshold value corresponding to detection of a laser energy pixel, or the threshold value may vary based on a power level of the incident laser energy pixel being detected (i.e., based on a power setting of a laser energy source corresponding to the laser energy pixel).

Depending on the particular embodiment, the measurements of a laser array described herein may be used for any suitable purpose. For example, as discussed above, the position of each laser energy pixel in a laser array can be determined for calibration purposes, (e.g., to determine a true position of the laser array relative to a reference position), for quality assurance purposes (e.g., to ensure that the internal optical components within an optics assembly are performing within their required performance specifications and/or to ensure that the system has not been damaged), and/or as a part of an initial machine qualification procedure for an additive manufacturing system. In some instances, if a positon and/or orientation of the laser array are not at a desired position and/or orientation relative to a reference position and/or orientation, the position and/or orientation of the laser array may be corrected. For example, the correction may consist of a mechanical adjustment of the position and/or orientation (e.g., a rotation) of the optics assembly on a gantry mount, which may be achieved via a manual shim and/or manual adjustment of an adjustment screw or other adjustment feature. Alternatively or additionally, a controller of an additive manufacturing system may be configured to automatically determine an appropriate adjustment in response to a signal received from a sensor of a laser array position detector, and the controller may be configured to automatically move the optics assembly to facilitate the adjustment. For example, such automatic adjustments may be performed using hardware such as a piezo-based rotational adjustment and/or a rotary table mount. In further embodiments, a controller may be configured to compensate for a misalignment and/or misorientation of the optics assembly using software and control schemes during an additive manufacturing process such that the laser array may be scanned across a build surface at a correct position and orientation compared to the movement of the gantry carrying the optics assembly.

In addition to the above, in some embodiments, the systems described herein may further include a vision system configured to determine a positon and/or orientation of a laser array relative to a reference target, such as a vision system target pattern. For example, in some embodiments, the reference target may be positioned on a plate of a laser array position detector in which the aperture of the positon detector is formed, and the absolute position of the reference target may be fixed relative to the position of the aperture. In this manner, a first offset distance between the reference target and the optical sensor located within the aperture may be fixed and known to a high degree of precision. By detecting both the position of the laser energy pixels comprising the laser array with the optical sensor and the position of the reference target with the vision system sensor, the system may be able to precisely determine a second offset distance between the laser energy pixels in the array and the sensor of the vision system. For example, the second offset distance may correspond to a distance between a centerline of the vision system sensor and a centerline of the laser array or one or more pixels of the array. In some instances, the second offset distance may be defined by offset distances measured along two directions (e.g., along X and Y directions defined in a reference frame of the additive manufacturing system). This second offset distance may subsequently be used during an additive manufacturing process to precisely control the position of the laser array based on a position of a feature detected with the vision system.

For example, in some embodiments, the vision system may be used to locate objects or features on a build surface (i.e., on a powder bed), and the second offset distance may be used to direct laser energy from the laser array towards the identified objects or features. For instance, the vision system may be used to locate a round target surface on the build surface, and the known offset between the vision system and the laser array may be used to locate the laser array relative to the identified round target surface. This information can subsequently be used by the additive manufacturing system to form shapes on the round target that are accurately positioned on the target. While a round target feature is described above, it should be understood that the current disclosure is not limited to any particular shape or geometry of target feature identified by the vision system. In some instances a vision system may reduce the requirements for locating features on a build surface on which a manufacturing process may be performed (e.g., a three dimensional printing process), and may allow for accurately locating sub-features on existing tool, build surface, and/or manufactured part features without requiring precise prior knowledge of the location of these features prior to beginning a manufacturing process.

According to some aspects, the systems described herein may allow for the determination of an offset distance between a laser energy pixel array and a vision system. For example, one or more of the laser energy pixels may be activated to form a shape or pattern on a powder bed surface or on a build plate of an additive manufacturing system, and subsequently, the vision system may be scanned across the shape or pattern and the offset distance may be calculated. In one exemplary embodiment, a first laser energy pixel of a laser array may be scanned across the build plate along two orthogonal directions (e.g., along X and Y directions) to form a cross shape on the build plate. If the power settings for first laser energy pixel are sufficient, this scanning pattern may form weld tracks on the build plate corresponding to the cross shape. This cross shape (or other suitable shape) may then be scanned by the vision system, and the offset distance between the vision system sensor and the first laser energy pixel may be calculated based on the position of the vision system sensor when then shape is detected by the vision system. Alternatively or additionally, one or more additional laser energy pixels in the array may be used to produce a weld track or sets of weld tracks on the powder bed surface or build plate, which may be detected by the vision system to determine various offsets and/or spacing between laser energy pixels as desired.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic representation of one embodiment of an additive manufacturing system 100. The system includes a machine enclosure 102, which in some instances may define an enclosed build volume within the machine enclosure. For example, the build volume within the machine enclosure 102 may comprise an inert gas atmosphere during an additive manufacturing process. The system further includes a build surface 104, on which powdered material may be deposited for each layer of a part to be manufactured. As such, the powdered material on the build surface may define a powder bed surface. The powder may be deposited onto the build surface via a recoater system (not depicted). The system 100 further includes a plurality of laser energy sources 106 optically coupled to an optics assembly 108 within the machine enclosure via a one or more optical cables 110, which may comprise a plurality of optical fibers. For example, the plurality of laser energy sources 106 may comprise at least 10, at least 20, at least 50, at least 100, at least 1000 or more individual laser energy sources, and each laser energy sources may be coupled to the optics assembly 108 via an associated optical fiber to direct laser energy from each respective laser energy source of the plurality of laser energy sources 106 into the optics assembly. The optics assembly 108 is mounted on a gantry 150, which may permit movement of the optics assembly 108 along at least two directions over the build surface 104 (e.g., directions parallel to a plane of the build surface 104).

The optics assembly 108 includes optical elements 112 configured to direct laser energy 114 from the laser energy sources onto the build surface 104 and to form a desired array of laser energy (i.e., a laser array 116) on the build surface. For example, the optical elements 112 may include beam forming optics such as lenses and mirrors which may shape and direct the laser energy within the optics assembly. In some embodiments, the lenses may include one or more of micro-lens arrays, and objective lenses. For example, micro-lens arrays may be arranged to collimate the laser energy output from each optical fiber and transform the beam shape of the laser energy, and objective lenses may be arranged to define a focal length for the combined array of laser energy and serve to demagnify the output from the micro-lens array. In some instances, this demagnification may be used to adjust the spacing of laser energy pixels in the array of laser energy formed on the build surface. For example, the objective lenses may be arranged to demagnify the array such that there is no spacing between adjacent pixels. Moreover, it should be understood that the current disclosure is not limited to any particular shape and/or arrangement of laser energy pixels in the array of laser energy formed on the build surface. For example, the array may be a rectangular array with regularly spaced pixels of laser energy, or the array may be an irregular shape with non-uniform spacing between pixels.

The additive manufacturing system 100 of FIG. 1 further includes a laser array position detector 118 configured to detect the position and/or orientation of the laser array 116 formed by the optics assembly 108. In the depicted embodiment, the laser array position detector includes a plate 122 in which an aperture 124 is formed. The aperture may have any suitable shape, including, but not limited to a circle, an oval, a square, a rectangle, other polygonal shapes, and/or irregular shapes. Moreover, the aperture may have any suitable size. For example, the size of the aperture (e.g., a diameter of a circular aperture) may be selected based on a desired positional sensing accuracy of the laser array position detector, as well as the power levels of the incident laser energy pixels and the power sinking capabilities of the detector 118. In some embodiments, the size of the aperture may be approximately the same size or smaller than the largest single laser energy pixel formed on the build surface by the optics assembly 108.

As illustrated in FIG. 1, the plate 122 may be positioned adjacent the build surface 104 within the machine enclosure 102, and the plate may be at the same level as the build surface. In this manner, a relative position, orientation, and/or spacing of the laser energy pixels comprising the laser array 116 as detected by the laser array position detector 118 will be the same as when the laser array 116 is projected onto the build surface 104 during an additive manufacturing process.

The laser array position detector 118 further includes a sensor 126 positioned below the aperture 124 (i.e., on a side of the aperture opposite the optics assembly 108). As discussed above, the sensor 126 may be sensitive to the particular wavelength of laser energy employed in the additive manufacturing system 100 (e.g., about 1080 nm in one embodiment). In this manner, when a laser energy pixel of the laser array 116 is scanned across the aperture 124 (e.g., by moving the optics assembly across the aperture via the gantry 150), the laser energy from the laser energy pixel may be detected by the sensor 126.

Upon detecting the laser energy pixel, the sensor 126 may send a signal to a controller 132 operatively coupled to the sensor to record the position of the laser energy pixel. For example, as shown in FIG. 1, the controller is also operatively coupled to the optics assembly 112 and the plurality of laser energy sources 106, such that the controller may control activation of one or more individual laser energy pixels (e.g., by activating a laser energy source associated with a particular laser energy pixel), and movement of the optics assembly 112 along the gantry 150. Accordingly, the controller 132 may determine the position of the laser energy based on the positon of the optics assembly 112 along the gantry 150 (e.g., a two dimensional coordinate) when the sensor 126 detects the laser energy pixel.

In the depicted embodiment, the laser array positon detector further includes optical components 128 positioned within the aperture 124 between an opening of the aperture and the sensor 126. As described below, such optical components may include one or more of lenses, mirrors, polarizing filters, and/or partial pass filters. Moreover, a heatsink 130 such as a cooled thermopile or black box may be positioned adjacent to the aperture 124 and sensor 126 to aid in dissipating heat from laser energy absorbed within the laser array position detector 118.

In addition to the above, the system 100 of FIG. 1 may further include a vision system including a vision system sensor (e.g., a camera or other suitable sensor) 134 mounted on the optics assembly 108, as well as a vision system target 136 positioned on the laser array positon detector 118 adjacent the aperture 124. The sensor 134 is mounted on the optics assembly so as to provide a fixed offset between a position of the laser array 116 and the position of the sensor 134. Similarly, the target 136 is positioned at a fixed and known offset distance relative to the aperture 124, such that upon determining a position of a laser energy pixel, the controller 132 may also determine an offset distance between the target 136 and the laser energy pixels of the laser array 116. During an additive manufacturing process, the vision system sensor 132 may identify one or more target features on the build surface on which one or more features may be formed (e.g., via a powder bed fusion process), and the controller 132 may use these two known offset distances to move the optics assembly such that the laser array 116 (or a desired subset of laser energy pixels of the laser array) is projected onto the target feature identified by the vision system. For example, as discussed above, in some instances, the vision system may identify predetermined features on the build surface (e.g., shapes such as circular shapes, polygonal shapes, irregular shapes, etc.) and automatically move the optics assembly such that a desired pattern of laser energy is projected onto the features, without requiring prior knowledge of where those features or shapes will be precisely located on the build surface during the additive manufacturing process. Accordingly, such systems may allow for simplification of the initial planning and/or programming of a build process, while not reducing the accuracy and/or precision of the manufacturing process.

As noted above, in some instances, the vision system sensor 134 may be operated in conjunction with the optics assembly 108 to determine an offset distance between the vision system sensor 134 and the laser energy pixels of the laser array 116 and/or a spacing between various pixels of the laser array 116. For example, one or more laser energy pixels may be activated and scanned across the build surface 104 to form a desired shape or pattern on the build plate or powder bed surface (e.g., by forming weld tracks on the build surface or melted powder shape on the powder bed surface) which may be subsequently detected by the vision system sensor 134. A desired offset distance may be determined by comparing a first position of the optics assembly 108 on the gantry 150 when the shape or pattern is formed by the one or more laser energy pixels of the laser array 116 and a second position of the optics assembly when the shape or pattern is detected by the vision system sensor 134.

Figure 2:
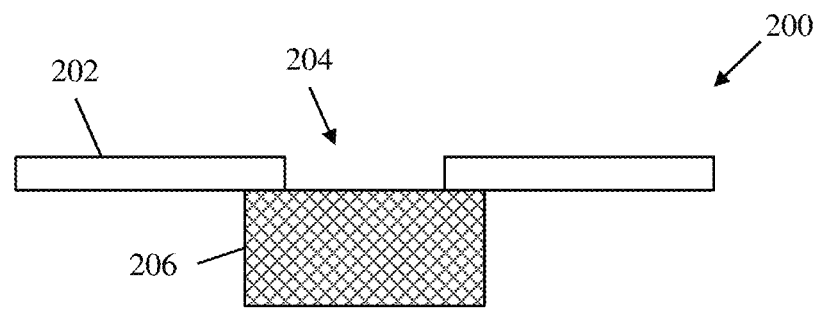
FIG. 2 is a schematic representation of one embodiment of a laser array position detector.

FIG. 2 depicts one embodiment of a laser array position detector 200. In this embodiment, the detector includes a plate 202 in which an aperture 204 is formed. A sensor 206 is directly coupled to the aperture 204. In particular, the sensor 206 is coupled to a side of the aperture opposite an optics assembly (not depicted) from which laser energy may be directed into the aperture 204 and detected by the sensor 206.

Figure 3:
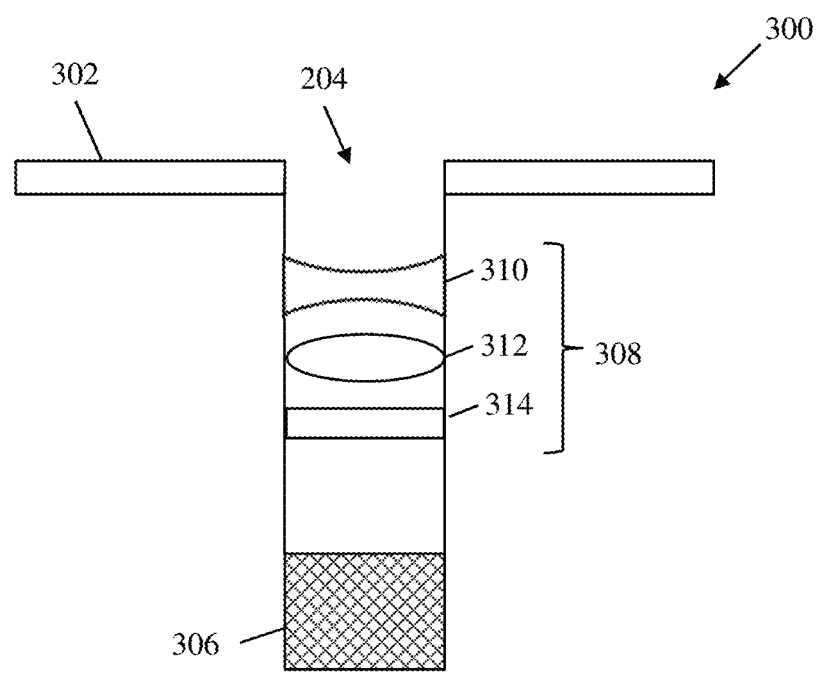
FIG. 3 is a schematic representation of another embodiment of a laser array position detector.

FIG. 3 depicts another embodiment of a laser array positon detector 300. In this embodiment, the sensor 306 is spaced from the plate 302 in which the aperture 304 is formed. In this manner, the detector 300 includes an elongated aperture 304 that extends below a surface of the plate 302, and the sensor 306 is positioned at the bottom of the aperture. As illustrated, the detector further includes an optics stack 308 positioned within the aperture 304 above the sensor 306. The optics stack may include a plurality of optical elements such as lenses 310, filters 312, and/or mirrors 314, which may aid in directing incident laser energy into the sensor, and/or may modify the laser energy entering the aperture before it reaches the sensor. For example, one or more filters and/or mirrors may alter one or more characteristics of incident laser energy such as a polarization or intensity to better match the characteristics of the sensor 306.

Figure 4:
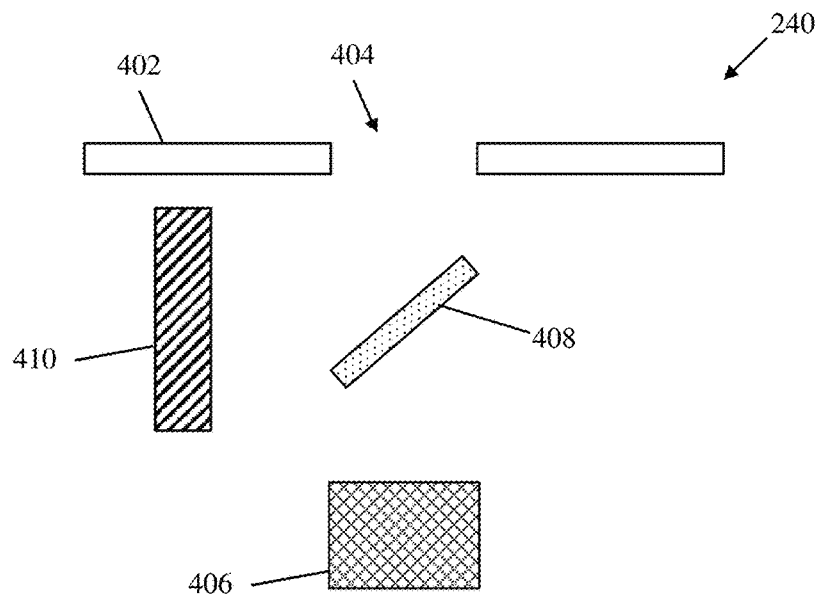
FIG. 4 is a schematic representation of a further embodiment of a laser array position detector.

FIG. 4 depicts yet another embodiment of a laser array position detector 400. Similar to the embodiment described above in connection with FIG. 3, the detector 400 includes a sensor 406 spaced from an opening of an aperture 404 formed in a plate 402. In this embodiment, a partial pass mirror 408 is positioned between the aperture 404 and the sensor 406. The partial pass mirror 408 may be configured to limit the amount of laser energy reaching the sensor 406 after being transmitted through the aperture 404. For example, a partial pass mirror 408 may permit only a small percentage of the incident laser energy to reach the sensor 406, which may facilitate the use of a lower power and/or higher sensitivity sensor. Excess laser energy that is not transmitted to the sensor 406 may be diverted to a heatsink 410, such as a cooled thermopile, a black box, or any other suitable heatsink structure.

Figures 5A, 5B:
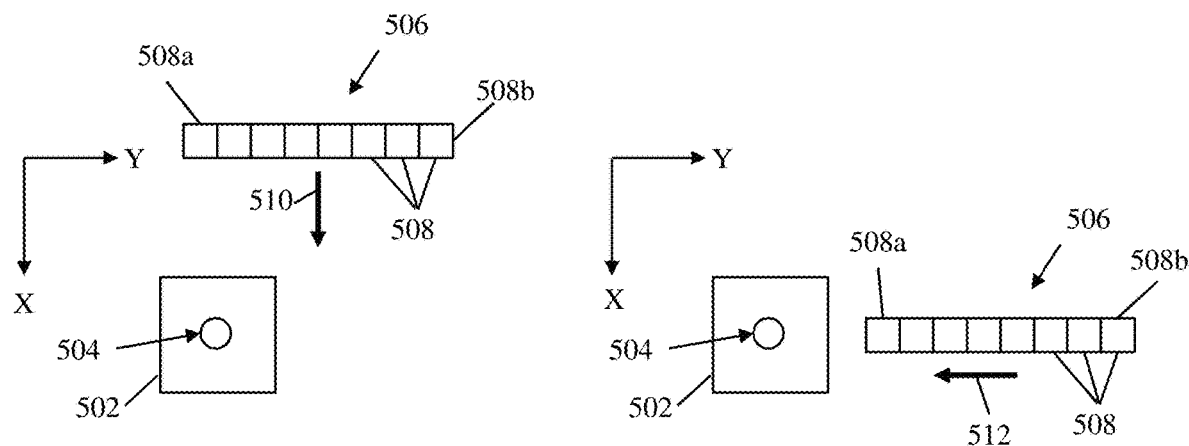
FIG. 5A is a schematic representation of a laser array being scanned across a laser array position detector along a first direction, according to some embodiments.
FIG. 5B shows the laser array position detector of FIG. 5A being scanned along a second direction.

Referring now to FIGS. 5A and 5B, an exemplary process for using a laser array position detector is described in more detail. In particular, these figures illustrate schematic top views of a plate 502 and aperture 504 of a laser array position detector. A laser array 506 comprising individual laser energy pixels 508 may be scanned across the aperture to determine the position of the pixels 508 of the laser array 506. For example, as shown in FIG. 5A, the laser array 506 may be scanned across the aperture 502 along a first direction 510 parallel to the X direction, with a first laser energy pixel 508a activated. When a sensor (not depicted) underlying the aperture 504 detects laser energy, the system may record the X coordinate of the first laser energy pixel 508a. As shown in FIG. 5B, the laser array 506 may be scanned across the aperture 504 along a second direction 512 parallel to the Y direction, such that the system may determine the Y coordinate of the first laser energy pixel 508a. In some instances, the above described processes may be repeated for one or more additional laser energy pixels 508 in the array 506. For example, the first pixel 508a may be deactivated, a second laser energy pixel 508b may be activated, and the scanning processes shown in FIGS. 5A and 5B may be repeated to determine the X and Y coordinates of the second laser energy pixel 508b. If the geometry of the array 506 is known, the positions of the first and second laser energy pixels 508a and 508b can be used to determine the position each laser energy pixel 508, as well as an orientation (e.g., a rotation) of the array 506 relative to the X-Y coordinate frame, which may correspond to a system master coordinate frame.

Figure 6:
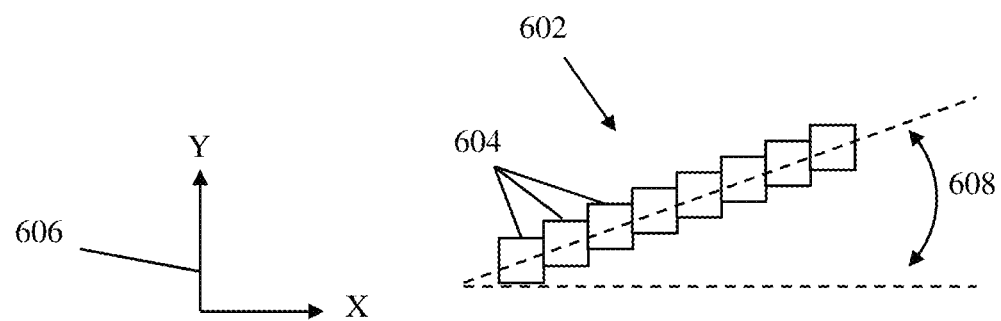
FIG. 6 is a schematic top view of a laser array, according to some embodiments.

For example, FIG. 6 depicts a schematic top view of a laser array 602 comprising individual laser energy pixels 604, in which the laser array 602 is misaligned relative to a system master coordinate frame 606. For instance, the positions of one or more of the laser energy pixels 604 may have been measured with a laser array position detector, as discussed above. The misalignment may define an offset angle 608. Using this offset angle, a system (e.g., an optics assembly) may be adjusted to correct the misalignment (manually and/or via an automated adjustment mechanism), and/or a controller of a system may automatically accommodate for the misalignment during a manufacturing process. For example, the controller may determine updated positions for an optics assembly throughout a manufacturing process to compensate for the misalignment.

Figure 7:
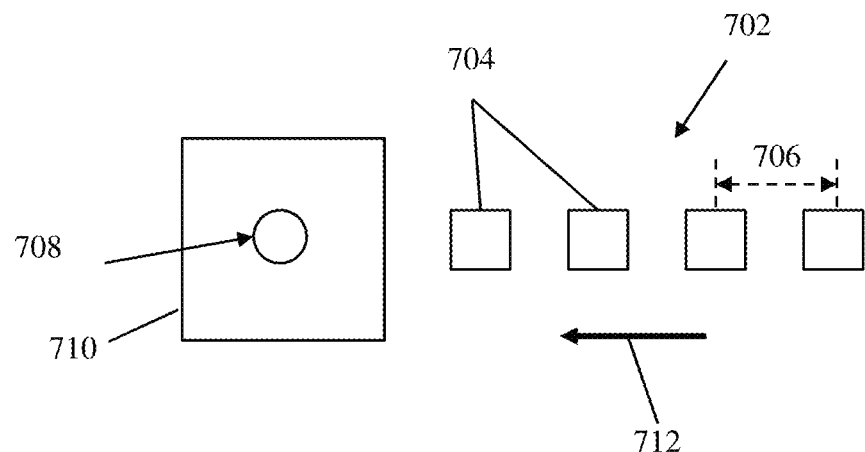
FIG. 7 is a schematic top view of a laser array and a laser array position detector, according to some embodiments.

As shown in FIG. 7, the systems and methods described herein may be used to determine a spacing between laser energy pixels in a laser array and/or a size of each pixel. For example. In particular, FIG. 7 depicts a laser array 706 in which the laser energy pixels are spaced apart by an interpixel spacing 706. The laser array may be scanned across an aperture 710 of a plate 710 of a laser array position detector along direction 712, and the detector may detect a position corresponding to a beginning and end of each laser energy pixel 704. In this manner, the detector may determine a width of each pixel (based on the positions of the beginning and end of each pixel), as well as the spacing between adjacent pixels (based on the positons of the end of one pixel and the beginning of a subsequent pixel).

Figure 8:
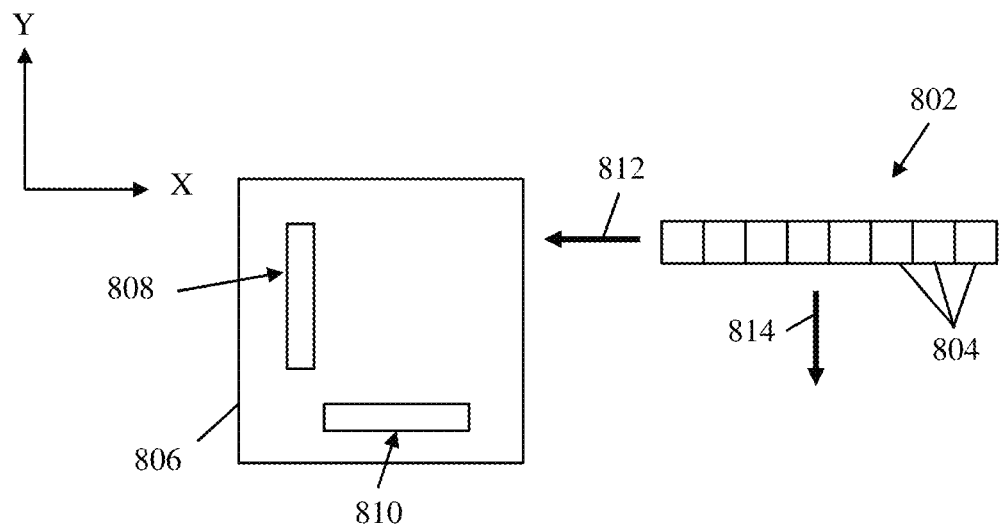
FIG. 8 is schematic top view of one embodiment of a laser array position detector including two apertures.

While the embodiments described above include a laser array position detector including a single aperture and associated sensor, it should be understood that other arrangements are also contemplated, such as systems employing more than one aperture and associated sensor. For example, FIG. 8 depicts an embodiment of a laser array position detector including two rectangular apertures 808 and 810 formed in a plate 806. The first aperture 808 may be configured to detect the positions of the laser energy pixels 804 of a laser array 802 as the array is scanned along a first direction 812 to determine a first coordinate of the laser energy pixels (e.g., a coordinate along the X axis). Similarly, the second aperture 810 may be configured to detect the positon of the laser energy pixels 804 as the array 802 is scanned along a second direction 814 to determine a second coordinate of the laser energy pixels (e.g., a coordinate along the Y axis).

Figures 9A, 9B:
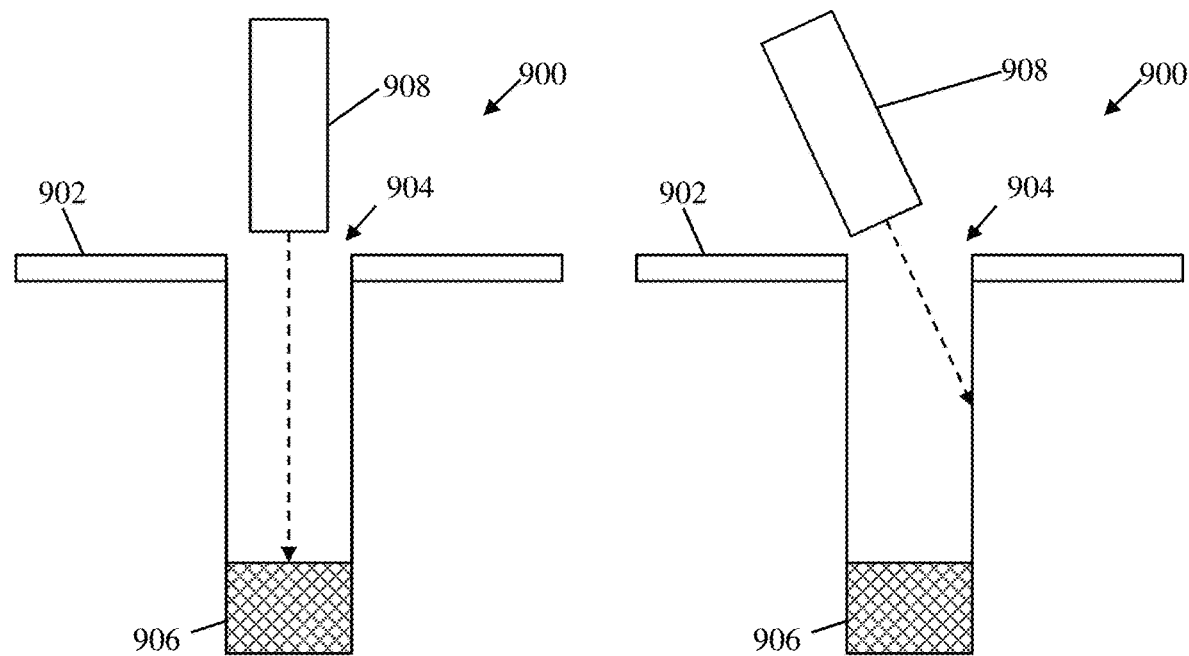
FIG. 9A is a schematic representation of one embodiment of a laser array position detector including an elongated aperture.
FIG. 9B shows the laser array position detector of FIG. 9A and illustrates a misaligned incident laser energy beam.
Figure 10:
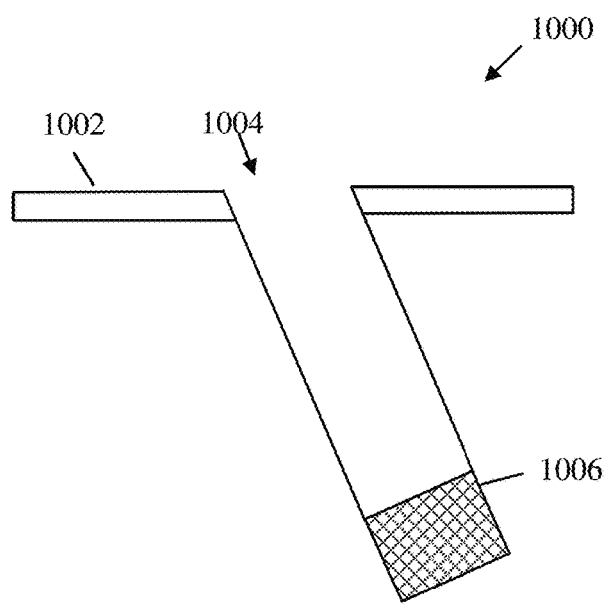
FIG. 10 is a schematic representation of another embodiment of a laser array position detector including an elongated aperture.

As noted above, in some embodiment, an aperture of a laser array may extend below a plate of a laser array position detector to define an elongated channel extending between the opening of the aperture and the sensor positioned at the bottom of the channel. According to some aspects of the current disclosure, such arrangements may facilitate detection of rotational misalignments of an optics assembly such that laser energy directed towards a build surface is misaligned relative to a desired incident angle (e.g., normal to the build surface). FIGS. 9A and 9B depict an illustrative embodiment of a laser array position detector 900 including such an elongated aperture 904 formed in a plate 904. As shown in FIG. 9A, if the incident laser energy 908 is properly aligned, the laser energy may reach the sensor 906 and be detected. However, if the incident laser energy is misaligned as shown in FIG. 9B, the laser energy may contact sides of the aperture and thus not reach the sensor 906. While FIGS. 9A-9B depict an arrangement in which a desired incident angle is normal to a surface of the plate 904, it should be understood that other arrangements may be suitable. For example, FIG. 10 depicts an embodiment of a laser array detector 1000 in which the desired incident angle is offset relative to the surface normal of the plate 1002. In some instances, such arrangements may be desirable to reduce an amount of laser energy reflected from a build surface directly back towards an optics assembly. Accordingly, the aperture 1004 may be configured to extend along an angle relative to the surface of the plate such that laser energy detected by the sensor 1006 is limited to energy incident at the desired offset angle. In some embodiments, elongated apertures may be made from a high thermal conductivity material that allows for the absorbed incident energy to be conducted away in the form of heat. Such materials may reduce or prevent damage to the elongated apertures when the incident angle is not aligned with the elongated aperture. Alternatively or additionally, the aperture may be jacketed and actively cooled, such as by water cooling.

Figure 11:
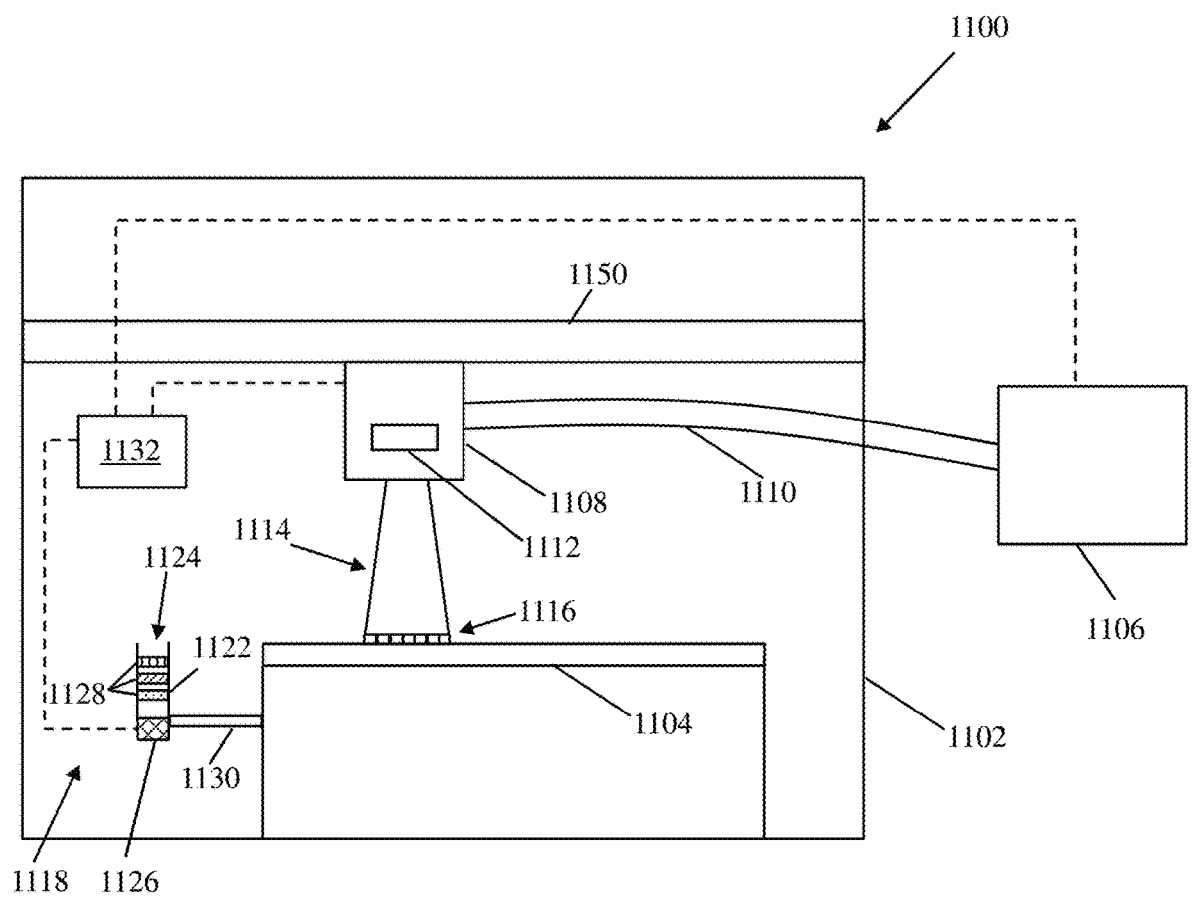
FIG. 11 is a schematic representation of an additive manufacturing system, according to some embodiments.

As discussed above, in some embodiments, a laser array position detector may not include a base plate in which an aperture is formed, but instead may include a laser energy sensor positioned within an aperture tube mounted in free space within the build volume of an additive manufacturing system. FIG. 11 depicts a schematic representation of one such embodiment of an additive manufacturing system 1100. Similar to the embodiment described above in connection with FIG. 1, the system 1100 includes a machine enclosure 1102, a build surface 1104 and a plurality of laser energy sources 1106 optically coupled to an optics assembly 1108 within the machine enclosure via a one or more optical cables 1110, which may comprise a plurality of optical fibers. The optics assembly 1108 is mounted on a gantry 1150, which may permit movement of the optics assembly 1107 along at least two directions over the build surface 1104. Moreover, the optics assembly 1108 includes optical elements 1112 configured to direct laser energy 1114 from the laser energy sources onto the build surface 1104 and to form a desired array of laser energy (i.e., a laser array 1116) on the build surface.

The additive manufacturing system 1100 of FIG. 11 further includes a laser array position detector 1118 configured to detect the position and/or orientation of the laser array 1116 formed by the optics assembly 1108. In the depicted embodiment, the laser array position detector includes an aperture tube 1122 that defines an aperture 1124. The aperture may have any suitable shape, including, but not limited to a circle, an oval, a square, a rectangle, other polygonal shapes, and/or irregular shapes. Moreover, the aperture may have any suitable size. For example, the size of the aperture (e.g., a diameter of a circular aperture) may be selected based on a desired positional sensing accuracy of the laser array position detector, as well as the power levels of the incident laser energy pixels and the power sinking capabilities of the detector 1118. In some embodiments, the size of the aperture may be approximately the same size or smaller than the largest single laser energy pixel formed on the build surface by the optics assembly 1108.

As illustrated in FIG. 11, the aperture tube 1122 may be mounted within free space within the machine enclosure 1102 via a mount 1130 such that the aperture 1124 is positioned adjacent the build surface 1104 and at the same level as the build surface, while other components of laser array position detector (such as mount 1130) are spaced from the build surface, and thus from the focal plane of the laser energy 1114. As discussed above, such arrangements may aid in avoiding or reducing damage caused by the incident laser energy.

Similar to the embodiments described above, the laser array position detector 1118 further includes a sensor 1126 positioned below the aperture 1124 (i.e., on a side of the aperture opposite the optics assembly 108) and configured to detect laser energy 1114. Upon detecting a laser energy pixel of the laser pixel array 1116, the sensor 1126 may send a signal to a controller 1132 operatively coupled to the sensor to record the position of the laser energy pixel. In the depicted embodiment, the laser array positon detector further includes optical components 1128 positioned within the aperture 1124 between an opening of the aperture and the sensor 1126. As discussed above, such optical components may include one or more of lenses, mirrors, polarizing filters, and/or partial pass filters.

Figure 12:
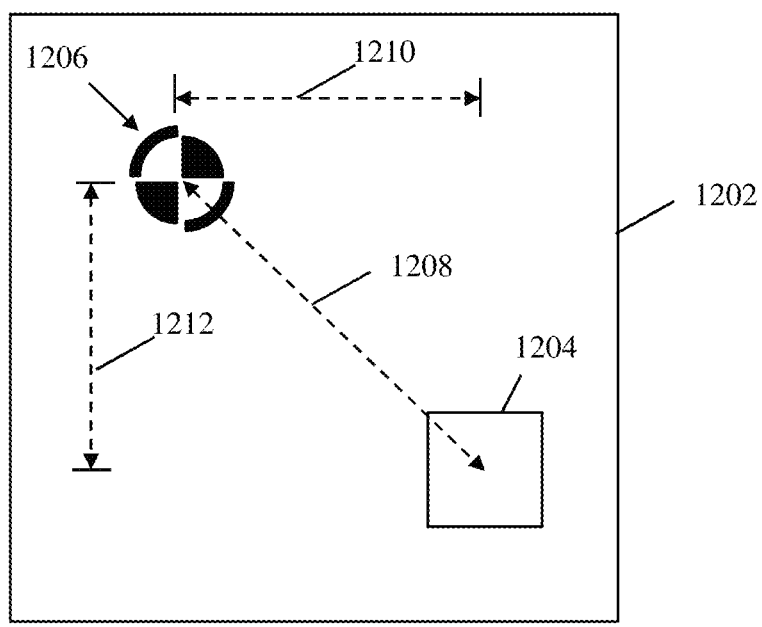
FIG. 12 is a schematic top view of a laser array position detector including a reference target.

As discussed above, in some embodiments, an additive manufacturing system including a vision system may utilize a known offset distance between a vision target and an optical sensor of a laser array position detector to determine an offset distance between the vision system sensor and the laser array. For example, FIG. 12 illustrates a schematic top view of a portion of laser array position detector including an aperture 1204 formed in a plate 1202. Similar to the embodiments described above, an optical sensor may be positioned within the aperture 1204 to detect laser energy pixels of a laser array when the laser energy pixels are scanned across the aperture. In the depicted embodiment, a reference target 1206 is provided on the plate 1202 at a first offset distance 1208 from the aperture 1204. The first offset distance 1208 may be known or measured to a high degree of precision, and in some instances may be described in terms of offset distances 1210 and 1210 measured along orthogonal axes (e.g., predetermined X and Y axes in an additive manufacturing systems). As discussed above, an additive manufacturing system may include a vision system including a vision system sensor (such as a camera) that may be mounted on an optics assembly and movable with the optics assembly. In this manner, the system may determine a second offset between the laser array and the vision sensor using the known first offset 1208. For example, the optics assembly may be scanned across the aperture 1204, and a first position of the optics assembly may be recorded when a laser energy pixel is detected by the optical sensor within the aperture 1204. The optics assembly may further be scanned across the reference target 1206, and a second position of the optics assembly may be recorded when the reference target 1206 is detected by the vision system sensor. Based on the first and second recoded positions as well as the known first offset distance, as second offset distance between the laser energy pixel of the laser array and the vision system sensor may be precisely determined. Subsequently, during an additive manufacturing process, the system may use this second offset distance to precisely position the optics assembly based on features identified by the vision system.

Figure 13:
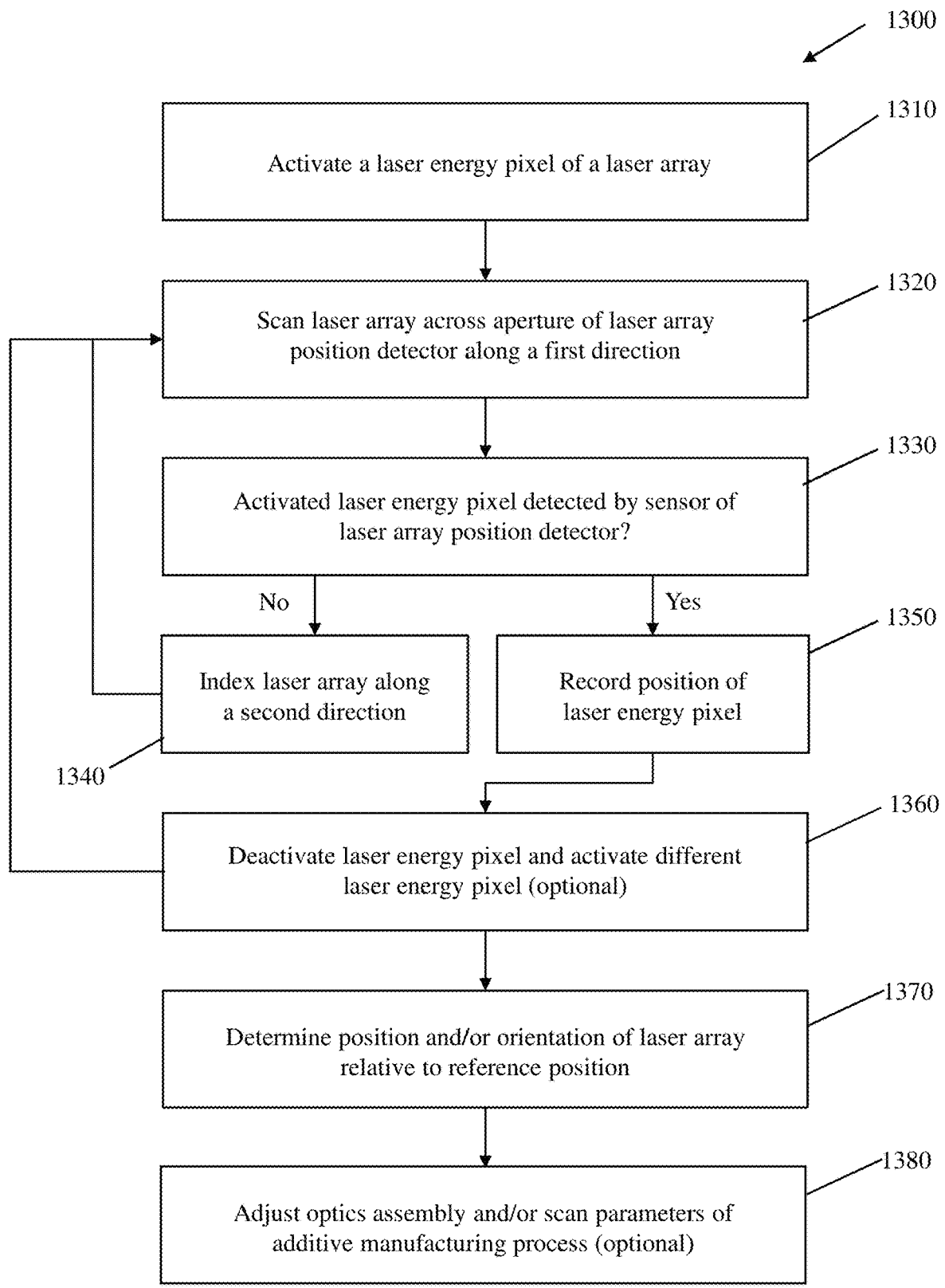
FIG. 13 is a flow chart illustrating a method of determining a position of one or more laser energy pixels in a laser array, according to some embodiments.

Referring now to FIG. 13, a process 1300 for determining a position of one or more laser energy pixels in a laser array is described in more detail. Depending on the particular embodiment, process 1300 may be implemented in any suitable manner, such as via a suitable hardware and/or software controller. For example, process 1300 may be performed on any suitable computing device(s) (e.g., a single computing device, multiple computing devices co-located in a single physical location or located in multiple physical locations remote from one another, one or more computing devices part of a cloud computing system, etc.), as aspects of the technology described herein are not limited in this respect. In some embodiments, a computing device may be a controller of a system implementing the disclosed methods. Further, similar to a controller, a computing device may include at least one hardware processor and at least one non-transitory computer-readable storage medium storing processor executable instructions that, when executed by at least one hardware processor, cause the at least one hardware processor to perform a method for determining a position of one or more laser energy pixels as described herein.

Process 1300 begins at step 1310, where a laser energy pixel of a laser energy array is activated. For example, the laser energy pixel may be activated by activating a laser energy source associated with the laser energy pixel. Next, the process proceeds to step 1320, where the laser array is scanned across an aperture of a laser array positon detector along a first direction. Next, at step 1330, it is determined whether the activated laser energy pixel was detected by a sensor of the laser array position detector. If the laser energy pixel was not detected at step 1330, the process proceeds to step 1340, where the laser array is indexed along a second direction, and the process subsequently returns to step 1320. If the laser energy pixel was detected at step 1330, the process proceeds to step 1350, where the positon of the activated laser energy pixel is recorder (e.g., in a data structure of a controller).

The process then optionally proceeds to step 1360, where the detected laser energy pixel is deactivated and a second (different) laser energy pixel of the laser array is actuated. If this optional step is performed, the process returns to step 1320 to determine the position of the second laser energy pixel. The process then proceeds to step 1370, where the position and/or orientation of the laser array relative to a reference orientation is determined based on the position of the laser energy pixel. For example, step 1370 may include using a known geometry of the laser array and the position of one or more laser energy pixels in the array to determine the position and/or orientation of the array relative to the reference position.

The process 1300 ends at optional step 1380, where an optics assembly of an additive manufacturing system and/or one or more scan parameters of an additive manufacturing process may be adjusted based on the position and/or orientation of the laser array determined in step 1370. For example, the optics assembly may be adjusted (manually and/or automatically) to correct a misalignment of the laser array relative to the optics assembly. Alternatively or additionally, a controller of an additive manufacturing system may use the relative position and/or orientation of the laser array determined at step 1370 to adjust one or more parameters of the additive manufacturing process to compensate for a misalignment.

Figure 14:
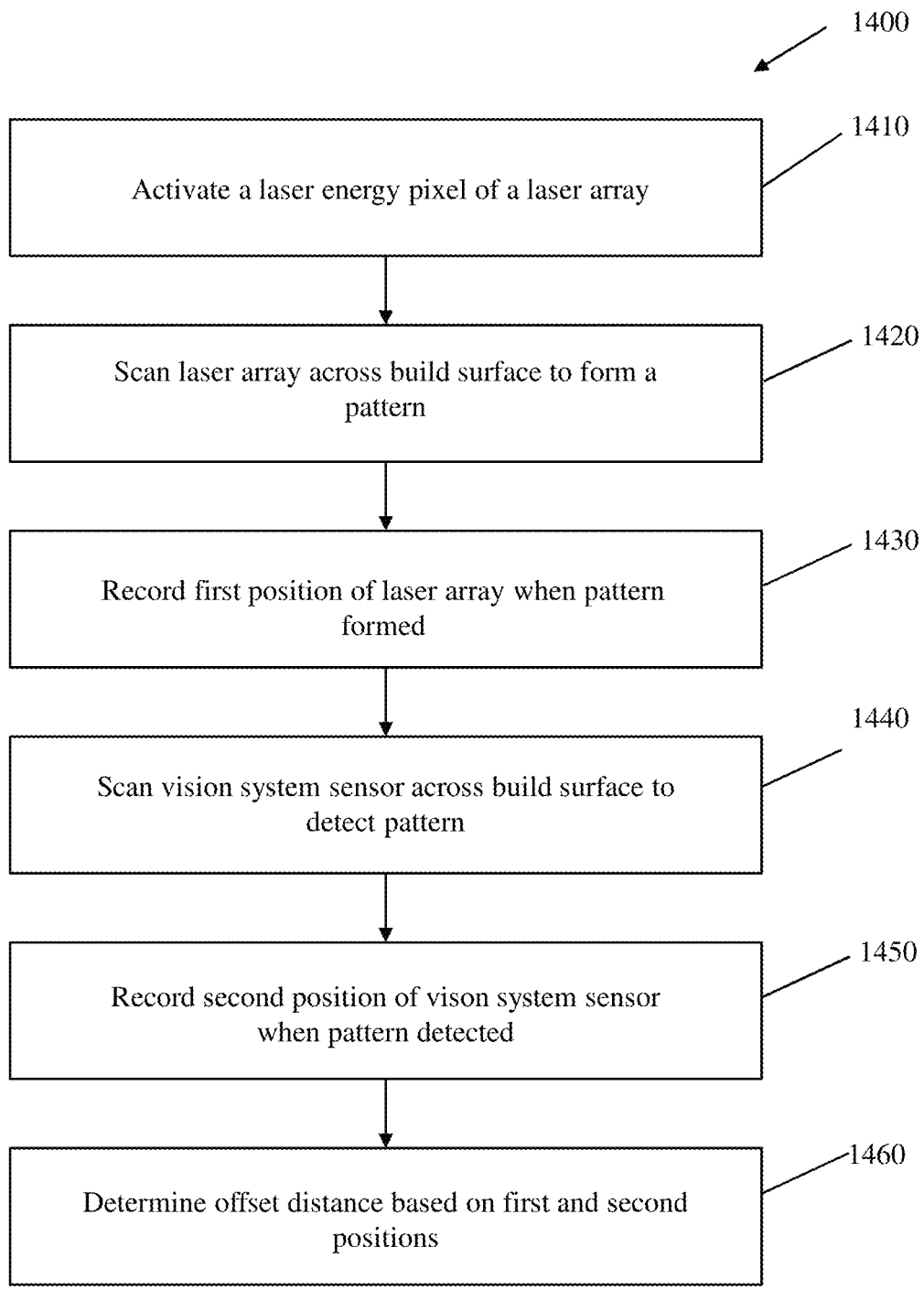
FIG. 14 is a flow chart illustrating a method of determining a position of a vision system relative to a laser array, according to some embodiments.

Referring now to FIG. 14, a process 1400 for determining a position of a vision system relative to one or more laser energy pixels in a laser array is described in more detail. Depending on the particular embodiment, process 1400 may be implemented in any suitable manner, such as via a suitable hardware and/or software controller. For example, process 1400 may be performed on any suitable computing device(s) (e.g., a single computing device, multiple computing devices co-located in a single physical location or located in multiple physical locations remote from one another, one or more computing devices part of a cloud computing system, etc.), as aspects of the technology described herein are not limited in this respect. In some embodiments, a computing device may be a controller of a system implementing the disclosed methods. Further, similar to a controller, a computing device may include at least one hardware processor and at least one non-transitory computer-readable storage medium storing processor executable instructions that, when executed by at least one hardware processor, cause the at least one hardware processor to perform a method for determining a position of one or more laser energy pixels as described herein.

Process 1400 begins at step 1410, where a laser energy pixel of a laser energy array is activated. For example, the laser energy pixel may be activated by activating a laser energy source associated with the laser energy pixel. Next, the process proceeds to step 1420, where the laser array is scanned across a build surface to form a first pattern. For example, the first pattern may be a shape or pattern formed by weld tracks in a build plate of an additive manufacturing system or by melted powder shapes or patterns formed on a powder bed surface. Next, at step 1430, a first position of the laser array is recorded that corresponds to the position of the laser array when the pattern was formed on the build surface. For example, the first position may be the position of a gantry on which the laser array is mounted. Next, the process proceeds to step 1440, where a vision system sensor is scanned across the build surface to detect the pattern formed at step 1430. The process then proceeds to step 1450, where a second position of the vision system is recorded that corresponds to the position of the vision system sensor when the pattern is detected. For example, similar to the laser array, the vision system may be mounted on a gantry, and the second position may be the gantry position when the pattern is detected by the vision system. Finally, at step 1460, an offset distance between the laser energy pixel and the vision system sensor is determined based on the first and second positions recorded at steps 1430 and 1450, respectively.

Figure 15:
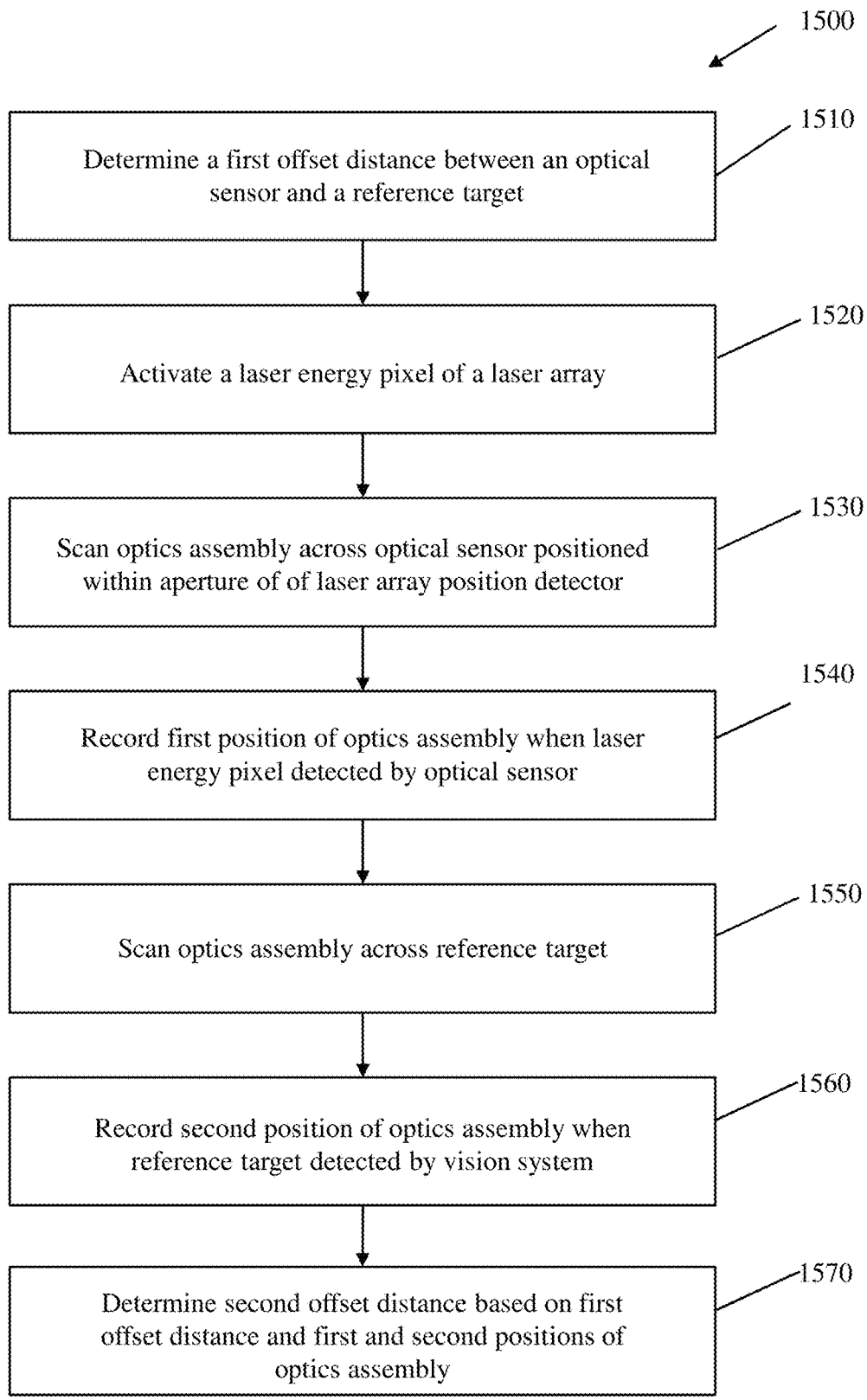
FIG. 15 is a flow chart illustrating another method of determining a position of a vision system relative to a laser array, according to some embodiments.

Referring now to FIG. 15, a process 1500 for determining an offset distance between a laser array and a vision system sensor is described in more detail. Depending on the particular embodiment, process 1500 may be implemented in any suitable manner, such as via a suitable hardware and/or software controller. For example, process 1400 may be performed on any suitable computing device(s) (e.g., a single computing device, multiple computing devices co-located in a single physical location or located in multiple physical locations remote from one another, one or more computing devices part of a cloud computing system, etc.), as aspects of the technology described herein are not limited in this respect. In some embodiments, a computing device may be a controller of a system implementing the disclosed methods. Further, similar to a controller, a computing device may include at least one hardware processor and at least one non-transitory computer-readable storage medium storing processor executable instructions that, when executed by at least one hardware processor, cause the at least one hardware processor to perform a method for determining a position of one or more laser energy pixels as described herein.

Process 1500 begins at step 1510, where a first offset distance between an optical sensor and a reference target on a laser array position detection system. As discussed above, the optical sensor may be positioned within an aperture formed on a plate of the laser array position detection system, and the reference target may be provided on the plate. The first offset distance may be precisely determined, for example, by measuring the distance between the reference target and the optical sensor (or aperture in which the optical sensor is positioned), and/or by placing, forming, or otherwise positioning the reference target and a predetermined position relative to the optical sensor. Next, at step 1520, a laser energy pixel of a laser array is activated, and at step 1530, an optics assembly is scanned across an optical sensor to scan the laser energy pixel across the optical sensor. The optical sensor may be positioned within an aperture of a laser array position detector, as described above. The process then proceeds to step 1540, at which a first position of the optics assembly is recorded when the laser energy pixel is detected by the optical sensor. For example, the first position may be a position of a gantry system on which the optics assembly is mounted when the laser energy pixel is detected. Next, at step 1550, the optics assembly is scanned across a reference target that may be detected by a sensor of a vision system mounted on the optics assembly, and at step 1560, a second position of the optics assembly is recorded when the reference target is detected by the vision system. Finally, the process proceeds to step 1570, at which a second offset distance is determined based on the first offset distance determined at step 1510, the first position of the optics assembly determined at step 1540, and the second position of the optics assembly determined at step 1560. As discussed above, in some instances, an additive manufacturing system may use the second offset distance to precisely and accurately position the laser array based on one or more features detected by the vision system during an additive manufacturing process. Moreover, it should be appreciated that process 1500 may be repeated to determine offset distances between the vision system sensor and one or more additional laser energy pixels of the laser array. Alternatively, if the relative position of each laser energy pixel in the laser array is known (e.g., using process 1300 described above or another suitable process), process 1500 may be performed once to determine the offset distances between the vision system sensor and each laser energy pixel.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semicustom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Thus, while the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

What is claimed is:

1. An additive manufacturing system comprising:
   a build surface;
   a plurality of laser energy sources;
   an optics assembly movable relative to the build surface and configured to direct laser energy from the plurality of laser energy sources towards the build surface and to form an array of laser energy pixels on the build surface;
   at least one sensor configured to detect the laser energy from a laser energy pixel; and
   at least one processor operatively coupled to the optics assembly and the at least one sensor, wherein the at least one processor is configured to move the optics assembly relative to the at least one sensor to scan at least two laser energy pixels across the at least one sensor, and wherein the at least one processor is configured to determine an angular orientation of the array of laser energy pixels based at least in part on detected laser energy from each of the at least two laser energy pixels.

2. The additive manufacturing system of claim 1, wherein the at least one processor is configured to determine a position of each of the at least two laser energy pixels based at least in part on the detected laser energy from each of the at least two laser energy pixels, and to determine the angular orientation of the array of laser energy pixels based at least in part on the determined position of each of the at least two laser energy pixels.

3. The additive manufacturing system of claim 2, wherein the at least one processor is configured to determine a position of each laser energy pixel of the array of laser energy pixels and to determine the angular orientation of the array of laser energy pixels based at least in part on the determined position of each of the laser energy pixels of the array of laser energy pixels.

4. The additive manufacturing system of claim 1, further comprising an aperture sized and shaped to permit laser energy to pass through the aperture to the at least one sensor.

5. The additive manufacturing system of claim 4, further comprising a laser array position detector comprising one or more of the at least one sensor and a plate, wherein the optics assembly is moveable relative to the laser array position detector to scan the at least two laser energy pixels of the array of laser energy pixels across the aperture, and wherein the at least one processor is configured to determine the position of each of the at least two laser energy pixels relative to a reference position of the optics assembly.

6. The additive manufacturing system of claim 5, wherein the optics assembly is movable relative to the laser array position detector to scan each laser energy pixel of the array of laser energy pixels across the at least one sensor, and wherein the at least one processor is configured to determine a position of each laser energy pixel relative to the reference position.

7. The additive manufacturing system of claim 4, wherein the aperture is defined by a tube mounted within a free space within a build volume of the additive manufacturing system.

8. The additive manufacturing system of claim 4, wherein the aperture defines an elongated channel extending towards the at least one sensor.

9. The additive manufacturing system of claim 4, wherein the aperture is formed in a plate positioned substantially level with the build surface.

10. The additive manufacturing system of claim 1, further comprising an aperture sized and shaped to permit laser energy to pass through the aperture to the at least one sensor, wherein the aperture is defined by a tube mounted within a free space within a build volume of the additive manufacturing system.

11. The additive manufacturing system of claim 1, further comprising an aperture sized and shaped to permit laser energy to pass through the aperture to the at least one sensor, wherein the aperture defines an elongated channel extending towards the at least one sensor.

12. The additive manufacturing system of claim 1, further comprising an aperture sized and shaped to permit laser energy to pass through the aperture to the at least one sensor, and further comprising one or more optical components positioned between the aperture and the at least one sensor.

13. The additive manufacturing system of claim 12, wherein the one or more optical components comprise one or more of lenses, polarizing filters, mirrors, and/or partial pass filters.

14. The additive manufacturing system of claim 1, further comprising a laser array position detector comprising one or more of the at least one sensor, wherein the laser array position detector further comprises a visual reference target spaced from the at least one sensor, and the optics assembly further comprises a second sensor configured to detect the visual reference target.

15. The additive manufacturing system of claim 14, wherein the at least one processor is operatively coupled to the second sensor and configured to determine an offset between the position of the visual reference target and the position of the array of laser energy pixels.

16. The additive manufacturing system of claim 15, wherein the second sensor is configured to determine a position of a target feature on the build surface, and wherein the at least one processor is configured to use the offset to move the optics assembly to position the array of laser energy pixels relative to the target feature.

17. The additive manufacturing system of claim 1, wherein the at least one sensor comprises at least two sensors, and wherein the at least one processor is configured to determine a first offset distance in a first direction and a second offset distance in a second direction of a position of one or more of the at least two laser energy pixels based at least in part on laser energy detected by each of the at least two sensors.

18. The additive manufacturing system of claim 1, wherein the at least one sensor is formed in a plate positioned substantially level with the build surface.

19. The additive manufacturing system of claim 1, wherein the optics assembly is configured to be translated relative to the build surface.

20. The additive manufacturing system of claim 1, wherein the at least one processor is configured to detect a misorientation between the determined angular orientation of the array of laser energy pixels and a desired angular orientation of the array of laser energy pixels based at least in part on the detected laser energy from each of the at least two laser energy pixels.

21. The additive manufacturing system of claim 20, wherein the at least one processor is configured to move the optics assembly to correct the misorientation.

22. The additive manufacturing system of claim 20, wherein the optics assembly is moveably coupled to a gantry mount and at least one of a position and an orientation of the optics assembly on the gantry mount is adjustable to correct the misorientation.

23. The additive manufacturing system of claim 20, wherein the at least one processor is configured to determine an offset angle between the determined orientation and the desired orientation.

24. The additive manufacturing system of claim 23, wherein the at least one processor is configured to determine updated positions for the optics assembly throughout a manufacturing process to compensate for the misorientation based on the offset angle.

* * * * *